United States Patent [19]

Herndon

[11] 4,103,435

[45] Aug. 1, 1978

[54] HEAD TRACKABLE WIDE ANGLE VISUAL SYSTEM

[75] Inventor: John W. Herndon, Orlando, Fla.

[73] Assignee: The United States of America as represented by the Secretary of the Navy, Washington, D.C.

[21] Appl. No.: 730,892

[22] Filed: Oct. 8, 1976

[51] Int. Cl.² ............................................. G09B 9/08
[52] U.S. Cl. .................................... 35/12 N; 358/104
[58] Field of Search .................... 35/11 R, 11 A, 12 B, 35/12 E, 12 G, 12 N, 12 W, 10.2, 25; 2/6; 340/324 A, 324 AD; 358/104, 211; 364/200, 900

[56] References Cited

U.S. PATENT DOCUMENTS

| 3,131,487 | 5/1964 | Lyon et al. | 35/12 N |
|---|---|---|---|
| 3,205,303 | 9/1965 | Bradley | 35/12 N X |
| 3,560,644 | 2/1971 | Petrocelli | 358/104 |
| 3,580,978 | 5/1971 | Ebeling | 358/104 |
| 3,638,228 | 1/1972 | Hill | 35/12 B |
| 3,670,426 | 6/1972 | Horowitz | 35/12 N |
| 3,697,681 | 10/1972 | McCoy | 358/104 |
| 3,784,742 | 1/1974 | Burnham | 35/12 N X |
| 3,820,134 | 6/1974 | Wilton et al. | 35/12 N X |
| 3,892,051 | 7/1975 | Bunker | 35/12 N |

Primary Examiner—Vance Y. Hum
Attorney, Agent, or Firm—Richard S. Sciascia; Don D. Doty

[57] ABSTRACT

A human head trackable wide angle visual system is disclosed which probes any given terrain constructed on a model board and causes selected image portions thereof to be projected on a trio of display sectors located on the inside of a spherical screen, with the view thereof being displayed thereon in accordance with control signals that are respectively portional to the turning of said head about a predetermined axis thereof. A head position sensor, a cockpit, a switching logic circuit, a synchronization signals generator, a trio of video switches, the aforesaid screen, and left, middle, and right light projectors are uniquely combined to provide such effects and, thus, simulate a real-life pilot training environment from a model thereof.

25 Claims, 7 Drawing Figures

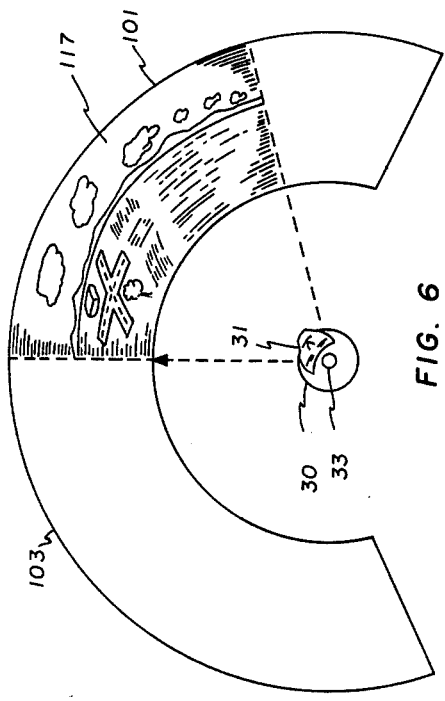
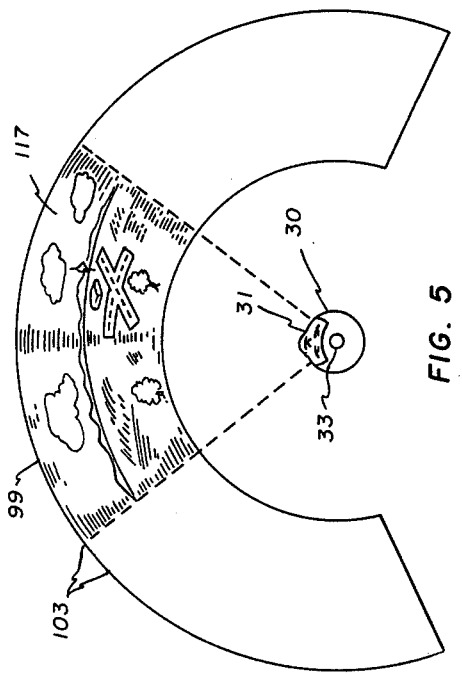
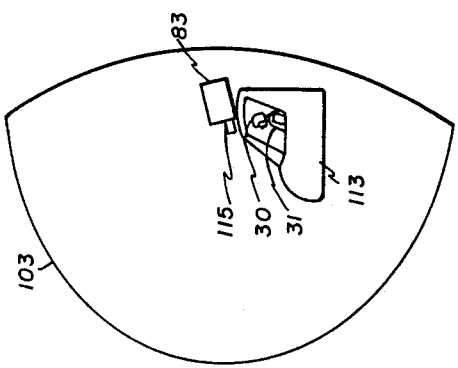
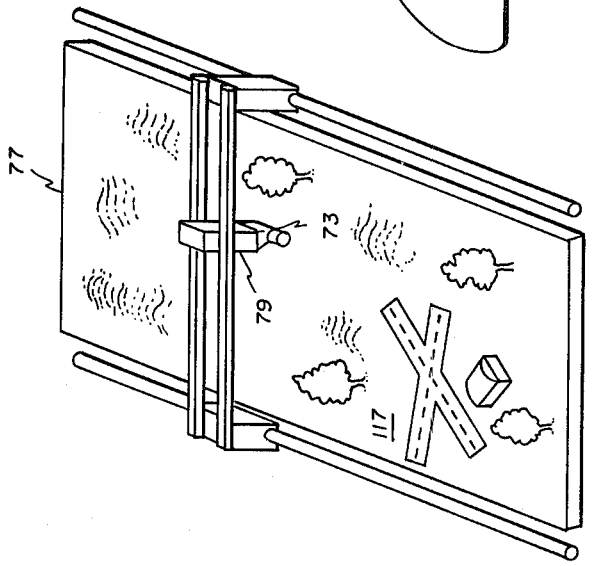
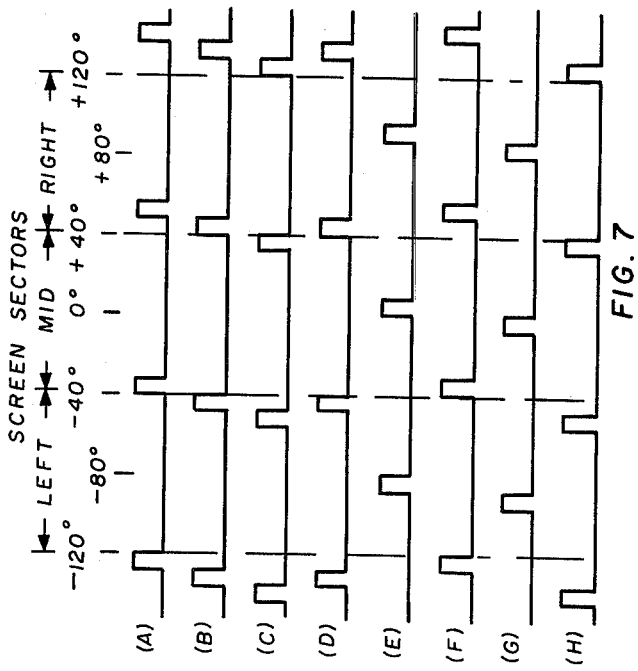
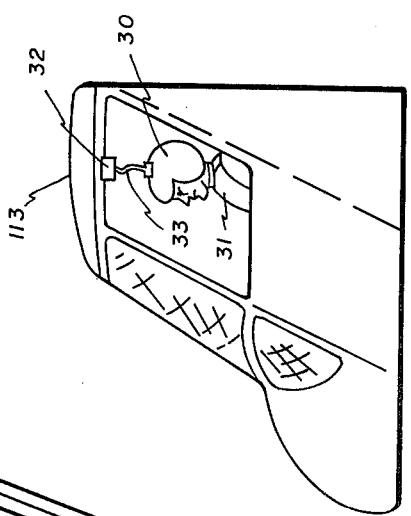

HEAD TRACKABLE WIDE ANGLE VISUAL SYSTEM

FIELD OF THE INVENTION

In general, the present invention relates to television systems and, in particular, comprises a television system for converting a predetermined scene probed from a relatively miniature model board into an enlarged, wide-angle display thereof on a screen having a predetermined curvature. In even greater particularity, the subject invention is a unique video system for generating and displaying an image, the position of the display of which is controlled by the position of an observer's head, so as to present an apparent wide angle realistic scene of said image thereto, regardless of the position of the head thereof.

DESCRIPTION OF THE PRIOR ART

Heretofore, numerous television and other video systems have been employed to probe images or scenes at one place and display them at another. Such systems are too numerous to discuss herewith. Besides, most thereof constitute prior art devices which are well known to the artisan, thereby obviating the need for further discussion thereof.

Of course, there are several prior art devices which are ostensively of some significance, inasmuch as they at least remotely or indirectly concern subject matter that is pertinent to the system constituting the instant head trackable wide angle visual system.

For example, U.S. Pat. No. 3,638,228 to Hill discloses an optical tracker used for the training of aircraft pilots which includes a hand controlled hydraulic system that drives a plotting board and a tracker on which is mounted a pair of binoculars. The binoculars are thus manually moved to keep them in the optical path between the operator's eyes and object being tracked.

U.S. Pat. No. 3,131,487 to Lyon et al provides a film transparency of a terrain scene which is viewed through optical means by a trainee. The position viewed on said scene is changed by the trainee operating the flight controls of an aircraft, as a photographic mission is flown thereby, and at the same time, a fixed photographic camera records said position.

U.S. Pat. No. 3,670,426 to Horowitz provides an optical probe which is coupled to a television camera in a manner similar to that used in numerous flight trainers that include visual systems. Said probe views a model board and causes roll, pitch, and yaw motions to be produced by means of standard X, Y, and Z motions.

U.S. Pat. No. 3,580,978 to Ebeling provides a wide angle display by using several projectors to make a complete composite scene from various image generation means, and special perspective effects with respect to said scene are produced as a result of the unique distortion of the film transparencies from which it is made.

From inspection of the aforementioned and other similar patents, it may readily be inferred that many attempts have been made to simulate real life flight or other scenes by mechanical, electrical, and optical means; however, insofar as it is known, none thereof have produced flight scene simulations which are controlled by the head of a pilot, thereby providing scene variations that appear to be similar to those which a pilot would see when he turns his head to the left or to the right.

SUMMARY OF THE INVENTION

From the above, it may readily be seen that there is a need for means to produce improved wide angle displays which may be used in flight and other trainers, wherein the display screen is of the order of 240 degrees. The instant head trackable wide angle visual system, to a considerable extent, fills that need.

For instance, the wide angle visual system constituting the present invention overcomes many of the disadvantages of the prior art, especially those with respect to flight and other simulator systems. At this point, however, it would perhaps be noteworthy that the preferred embodiment described below is a video system that is or may be used to an advantage as a part of a flight training simulator; nevertheless, it should also be obvious that it could be used to an advantage in conjunction with numerous other type simulators where ambient environmental scenes are required in order to effect realism therein or with respect thereto.

Thus, the preferred embodiment of the invention to be discussed now will be considered as being a visual system for a flight simulator. In such system, a wide angle, substantially spherical display screen is oriented with respect to an aircraft cockpit, such that a pilot's eye position is near or at the center thereof and that the exit pupil of a projection system combined therewith is very near the center thereof, too. To provide a pilot with a real-time image that is appropriate to his flight and landing training, an image generator is utilized which consists of a model board featuring an aircraft landing field and other terrain, an optical probe for collecting light ray reflections from said model board scene, a television camera for converting the probed image received from said light ray reflections into a video signal, a gantry system (not shown in detail) which provides motion to said camera-probe combination along all possible flight paths within the limits of said model board, and a system for moving said optical probe left and right with the movement of the pilot's head, while at the same time projecting the scene he would be viewing with or without turned head by means of sector projectors and associated control circuitry.

It should be appreciated at this time that, although the foregoing discussion pertains to a device which treats the case of a wide angle visual presentation in the horizontal field of view, the same technique and apparatus may be used to cover the vertical field of view situation — or any other field of view situation, for that matter — in the event a greater angle of visual coverage need be addressed. Of course, it should also be obvious to the artisan that, if desired, both horizontal and vertical fields of view may be treated simultaneously by the techniques taught herewith. Obviously, it would be well within the purview of one skilled in the art having the benefit of the teachings presented herewith to make whatever design selections as would be necessary to include any field of view situation desired during any given simulation situation.

It is, therefore, an object of this invention to provide an improved wide angle visual system.

Another object of this invention is to provide a wide angle visual system which generates simulated scenes which may be varied in proportion to the turning of an observer's head.

Still another object of this invention is to provide an improved means for collecting light rays reflected from a narrow field of view modeled scene and for converting them to light rays that are projected to a wide angle field of view screen with life-like size and fidelity.

A further object of this invention is to provide a head trackable video system.

A further object of this invention is to provide a means for continuously sensing the position of a human head or other object relative to a reference line-of-sight and for converting the position information thereof into servomechanism or other analog signals proportional thereto.

Another object of this invention is to provide a means for azimuthly shifting a displayed presentation of an image within a wide angle field of view in accordance with a control signal proportional thereto.

Still another object of this invention is to provide an improved means for simulating aircraft piloting situations from model board scenes.

Still another object of this invention is to provide an improved means for simulating real life situations for training purposes from miniature representations thereof.

Other objects and many of the attendant advantages of this invention will be readily appreciated as the same becomes better understood by reference to the following detailed description when considered in connection with the accompanying drawings wherein:

BRIEF DESCRIPTION OF THE DRAWING

FIG. 2 illustrates the display screen - cockpit - pilot relationship employed in the system of FIG. 1;

FIG. 3 depicts, in greater detail, the pilot - mechanical drive - sensor relationship employed in the system of FIG. 1;

FIG. 4 shows a representative model board that may be incorporated in the system of FIG. 1;

FIGS. 5 and 6 disclose forward and right field of view displays which may be operatively effected on the screen of the system of FIG. 1, respectively; and FIG. 7 graphically discloses representative synchronization signals, in time correlated relationships, that are the fundamental operatives generated by and used in the system of FIG. 1.

DESCRIPTION OF THE PREFERRED EMBODIMENT

Figure 1:
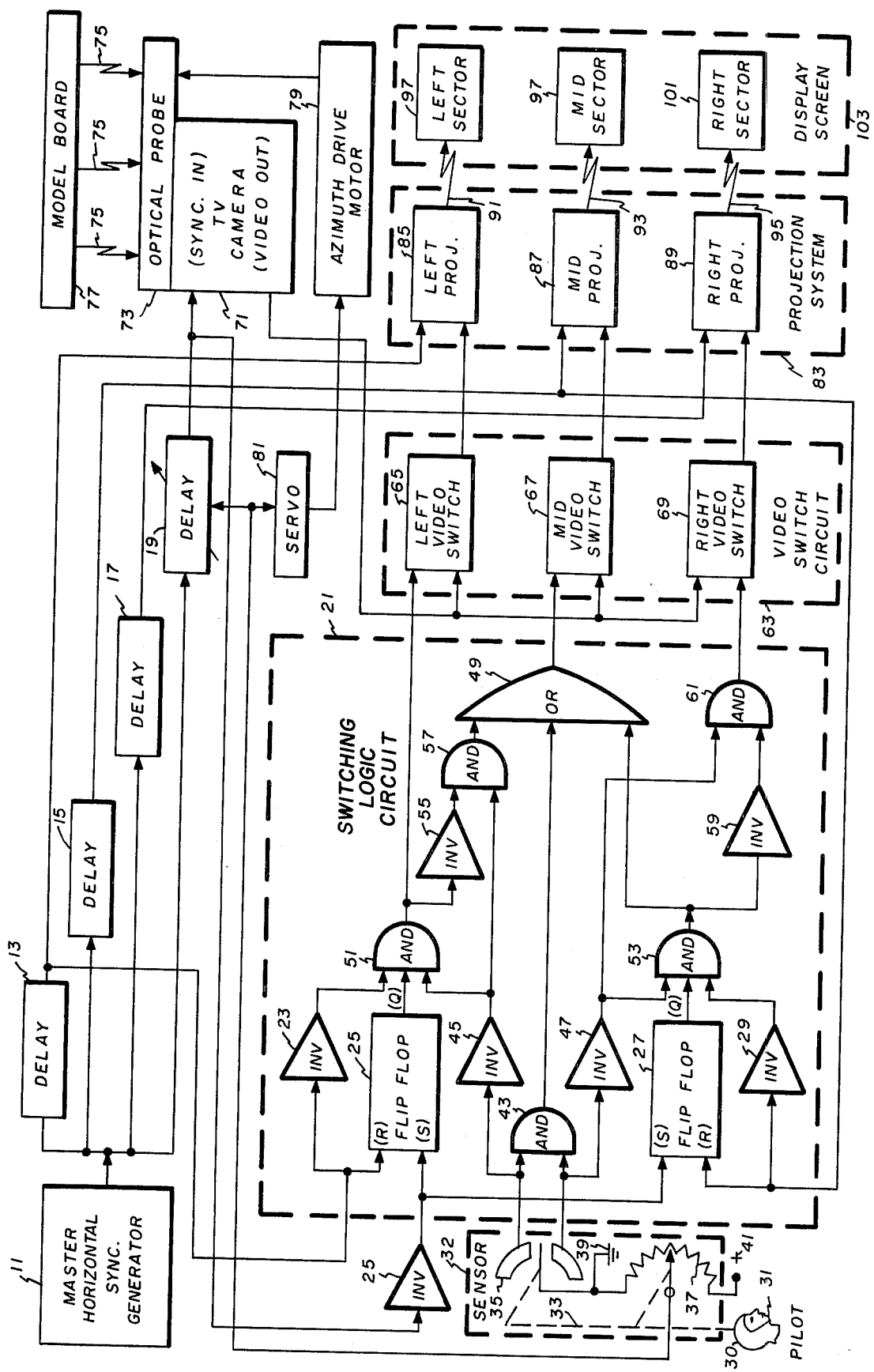
FIG. 1 is a block diagram of the system constituting the subject invention.

Referring now to FIG. 1, there is shown a master horizontal synchronization (sync) signal generator 11 for producing a signal at the output thereof which is similar to the horizontal sync signal generated in conventional television systems. The output thereof is connected to the inputs of a plurality of delay lines 13, 15, 17, and 19, with the output signals therefrom herewith defined as being left, mid, right, and camera sync signals, respectively. In general, the outputs of delays 13, 15, and 19 are effectively connected to appropriate inputs of a switching logic circuit 21. More specifically, the output of delay 13 is connected to the inputs of an inverter amplifier 23 and the reset (R) input of a bistable multivibrator type flipflop 25; the output of delay 15 is connected to the reset (R) input of another bistable multivibrator type flipflop 27 and the input of another inverter amplifier 29; and the output of delay 19 is connected to the set (S) inputs of both of the aforesaid flipflops 25 and 27 through an inverter amplifier 28.

The helmet 30 of a pilot 31 — in this case, an aircraft pilot trainee — is mechanically connected to a sensor 32 by means of a drive means 33 connected to the movable arm of a left, middle, and right sector selector switch 35, wherein (as shown in FIG. 1) the upper slide contact thereof pertains to the left sector, the space between the slide contacts thereof pertains to the mid sector, and the lower slide contact thereof pertains to the right sector. Of course, as is conventional in selector switches, the movable arm thereof may be rotated to contact any one of the aforesaid sectors.

Helmet 30 is also mechanically connected to the movable arm of a potentiometer 37 via said drive means 33; therefore, in effect, the movable arms of sector selector switch 35 and potentiometer 37 are effectively connected together for simultaneous movement with said helmet 30 and, thus, the head of pilot 31.

In order to give the pilot freedom of head movement, mechanical connection 33 between helmet 30 and the movable arms of selector switch 35 and potentiometer 37 should be as flexible as possible and still provide positive interactive motion therebetween. Hence, in such case, suitable flexible cables or the like may be used as drive means 33 for such purpose. Obviously, the available design selections for such cables are numerous, indeed.

In this particular preferred embodiment of the invention, it is intended that the head and helmet of pilot 31 turn left, forward, and right in the horizontal azimuth plane, although as previously mentioned, the subject system may be designed for head movement in any other plane or planes, as desired.

The movable arm of selector switch 35 and one of the terminals of the resistance portion of potentiometer 37 is connected to a ground 39, with the other terminal of said resistance portion being connected to a positive direct current voltage (+DCV) 41.

The left sector (upper) and right sector (lower) electrical slide contacts of selector switch 35 are respectively connected to the inputs of an AND gate 43; likewise, they are respectively connected to the inputs of a pair of inverter amplifiers 45 and 47. The output of AND gate 43 is connected to one of a trio of inputs of an OR circuit 49, and the outputs of inverters 45 and 47 are respectively connected to one of a trio of inputs of a pair of AND gates 51 and 53. The Q outputs of the aforesaid flipflops 25 and 27 are respectively connected to another of the trio of inputs of said pair of AND gates 51 and 53, and the outputs of the aforesaid inverters 23 and 29 are respectively connected to the remaining ones of the trio of inputs of said pair of AND gates 51 and 53. The output of AND gate 51 is connected to the input of another inverter 55, the output of which is connected to one of the inputs of another AND gate 57, and the output of said AND gate 57 is connected to another of the trio of inputs of the aforesaid OR circuit 49. The output of AND gate 53 is connected to the remaining one of the trio of inputs of the aforesaid OR circuit 49 and to the input of another inverter amplifier 59. The output of inverter 45 is connected to the other input of AND gate 57, the output of inverter 47 is connected to one of the inputs of another AND gate 61, and the output of inverter 59 is connected to the other input of said AND gate 61.

The outputs of OR circuit 49, AND gate 51, and AND gate 61 constitute the outputs of the aforementioned switching logic circuit 21, and they are, in general, connected to compatible inputs of a video switch circuit 63. Video switch circuit 63 includes a trio of control switches herewith defined and referenced as left video switch 65, mid video switch 67, and right video switch 69, each of which contains a data input and a control input. Thus, more specifically, the outputs of the aforesaid AND gate 51, OR circuit 49, and AND gate 61 are connected to the control inputs of left, mid, and right video switches 65, 67, and 69, respectively.

The aforementioned adjustable delay 19 contains a control input which is electrically connected to the movable arm of the aforesaid potentiometer 37, and the output of said delay 19 is connected to the sync signal input of a television camera 71. The video signal output of television camera 71 is connected to the data signal inputs of each of the aforesaid left, mid, and right video switches 65, 67, and 69.

Connected to television camera 71 is a rotatable optical probe 73 which is adapted for viewing — that is, receiving the reflected light rays 75 from— a model board 77 which, in turn, has a model of the pilot training scene constructed in miniature thereon. Optical probe 73 is rotatably driven about its vertical axis (in this case) by a reversible azimuth drive motor 79, thereby permitting said optical probe and television camera combination to timely and effectively scan predetermined left, middle, and right sectors of the scene on model board 75 in such manner as to properly present them to the eyes of pilot 31, as will be discussed more fully subsequently.

The input of azimuth drive motor 79 is connected to the output of a suitable servomechanism system 81, which, in turn, has its input connected to the movable arm of the aforesaid potentiometer 37, so as to cause physical synchronization of the azimuth position of drive motor 79 and optical probe 77 therewith. Of course, servo 81 is preferably of the kind which converts the voltage picked off the resistance portion of potentiometer 37 at any given instant to a particular azimuth angle for motor 79 and optical probe 73.

An appropriate projection system 83 is included in the subject invention, as it has been discussed so far. It comprises a trio of light projectors herewith defined and referenced as left projector 85, mid projector 87, and right projector 89, and each thereof has a data signal input and a sync signal input. The data signal inputs thereof are respectively connected to the data signal outputs of left, mid, and right video switches 65, 67, and 69, of video switch circuit 63; and the sync or control signal inputs thereof are respectively connected to the sync signal outputs of delays 13, 15, and 17.

The output signals from left, mid, and right projectors 85, 87, and 89 are, of course, light rays; and they are herewith referenced as light rays 91, 93, and 95, respectively. Said light rays 91, 93, and 95 are timely projected toward left, mid, and right sectors 97, 99, 101 of a display screen 103. As will be discussed more fully below, said sectors 97, 99, and 101 are consecutively disposed in a suitable contiguous manner on screen 103, the latter of which is curved to represent an ambient environmental view to pilot 31, although it may be flat or have some other geometrical configuration for other operational purposes.

At this time, it would perhaps be noteworthy that all of the elements and components disclosed in FIG. 1 are well known, conventional, and commercially available. Hence, it should be understood that it is their unique interconnections and interactions which effect the subject system and cause it to achieve the objectives stated above.

The remainder of FIGS. — that is, FIGS. 2 through 7 — of the drawing will now be explained briefly, and inasmuch as they may respectively contain some of the same components as those shown in block form in FIG. 1, the reference numerals therefor will be the same therein, too.

FIG. 2 depicts the operational situation in which the instant invention functions to an advantage. Illustrated therein is a substantially spherical, wide angle display screen 103 which is suitably oriented and positioned with respect to a mock aircraft cockpit 113, such that the pilot's eye position is near the center of said screen 103 and, in addition, such that the exit pupils 115 of projector system 83 are, likewise, as close to the center of screen 103 as physically practicable. Of course, should the occasion arise where it would be more advantageous to relatively position screen 103, cockpit 113, and projector system 83 in some other arrangement, so doing may be done without violating the spirit or scope of this invention.

FIG. 3 illustrates, in a more enlarged view, mock aircraft cockpit 113, pilot 31 wearing helmet 30, sensor 32, and mechanical drive cables 33. As may readily be seen, in the preferred embodiment being described herewith, sensor 32 is mounted inside the roof of aircraft cockpit 113, so that mechanical drive cables may hang therefrom without interfering with the view of the pilot and without impeding the movement of the head thereof for all practical purposes. Hence, pilot 31 may look forward or turn his head left or right in the horizontal or azimuth plane with complete comfort and optimum visibility.

FIG. 4 discloses a typical model board 77 which may be used to portray any scene 117 which is needed for training or other purposes. Also shown is optical probe 73 and representative camera 71 and drive motor 79 combined therewith. Of course, they are suspended from a conventional crane mounting assembly for movement backward, forward, and laterally, as desired, but such assembly does not constitute a part of this invention. It is merely shown to illustrate how camera 71 and its associated elements could be mounted for the probing and viewing of scene 117 of model board 77.

FIG. 5 illustrates pilot 31 looking straight forward toward the middle sector 99 of screen 103 and, hence, he sees scene 117 from the forward or 0° angle.

FIG. 6 shows pilot 31 looking toward the right sector 101 of screen 103 and, thus, he sees that portion of scene 117 that he would ordinarily see with his head in that position.

Therefore, it may readily be seen that model board scene 117 is shifted and varied in an amount proportional to the turning of the pilot's head. Comparison of FIGS. 5 and 6 discloses such pictorial shift. Obviously, although not shown, scene 117 would shift to left sector 97 if the pilot's head were turned to the left.

FIG. 7 represents suitable sync pulse relationships which are correlated in time for the left, mid, and right fields of view of camera 71, and will be discussed in somewhat greater detail during the discussion of the operation presented below.

MODE OF OPERATION

The operation of the invention will now be discussed briefly in conjunction with all of the figures of the drawing.

As best seen in FIG. 2, wide angle screen 103 provides pilot 31 with real-time images that are appropriate for training him to fly and land airplanes. The images therefor are generated from model board 77 which, as best seen in FIG. 4, features a terrain area having an aircraft landing field and other cultural and rural environmental elements needed to simulate actual flight conditions. Of course, while practicing, pilot 31 sits inside mock cockpit 113 which is constructed to have the appearance, instruments, and controls of the aircraft he is learning to fly, thereby giving him the feeling that he is in and flying an actual airplane. While so doing, he looks through the windshield and side windows thereof — as best seen in FIG. 3 — in the same manner as he would normally do while flying a real plane, in order to see left ground view sector 97, middle ground view sector 99, and right ground view sector 101 projected on screen 103. The latter mentioned projections of ground view sectors 99 and 101 are best portrayed by FIGS. 5 and 6, respectively. Therefrom, it may readily be seen that the scenes peojected thereon are taken from the terrain image constructed on model board 77, with the actual scenes shown thereon being those that would be seen by pilot 31 when he looked forward and to the right.

In order to project said forward and right (and left, too, but not shown) scenes there obviously must be some synchronization thereof with the turning of the pilot's head, and that is accomplished by the system of FIG. 1, the operation of which will now be discussed in some detail.

In order to properly time the sequence of events taking place within the system of FIG. 1, master horizontal sync signal generator 11 is employed to generate a master clock signal which is then delayed by delays 13, 15, 17, and 19, so as to produce a plurality of timely signals herewith defined as being left, mid, right, and camera sync signals, respectively. And, of course, it is these signals that are applied to switching logic circuit 21, camera 71, and projector system 83 in such manner as to effect the proper operation thereof.

Because selector switch 35 is of the rotary type with contact segments for the left and right sectors and a gap therebetween for the mid sector, and because the movable arm thereof is effectively connected to the head of pilot 31 by means of flexible cable 33, said left, mid, and right sectors are made operative by the left, forward, and right positions of said pilot's head. Likewise, the position of the movable arm of potentiometer 37 corresponds thereto, so as to supply a control voltage proportional thereto to properly regulate adjustable delay 19 and servo 81 for the purpose of causing camera 71 and azimuth drive motor 79 to be in proper synchronization, too.

The outputs of sensor 32 are taken from said left and right electrical contacts of selector switch 35 and, as may readily be seen, the signals therefrom are supplied to switching logic circuit 21, in general, and to the inputs of AND gate 43, respectively, in particular. AND gate 43 should be designed in such manner that the input terminals thereof are positive until such time as one or the other thereof is grounded — that is, made negative with respect to the aforesaid positive — as a consequence of the movable arm of switch 35 contacting the left or right sector thereof.

As previously implied, switching logic circuit 21 functions to effectively control the video signals supplied to left, mid, and right projectors 85, 87, and 89 of projection system 83. Since a common video input signal is constantly supplied to all of the aforesaid projectors by TV camera 71, without switching, the same video picture would be projected thereby and, hence, displayed on left, mid, and right sectors 97, 99, and 101 of screen 103 simultaneously, thus defeating the purpose of the invention. But due to the incorporation of switching logic circuit 21 in the instant invention, a unique combination of elements is formed which timely produces selected left, mid, and right video portrayals on said screen 103.

As previously mentioned, five functional input signals are supplied to switching logic circuit 21. They are: (1) the mechanical signal derived from the head of pilot 31 which represents the azimuthal position thereof at any given instant; (2) the left sync pulses (from delay 13); (3) the mid sync pulses (from delay 15); (4) the right sync pulses (from delay 17); and (5) the camera sync pulses (from delay 19). Also, as previously indicated, the aforesaid pulses are supplied to the input of inverter 23 and the reset input of flipflop 25, to the input of inverter 29 and reset input of flipflop 27, to the control input of right sector projector 89, and effectively to the set inputs of flipflops 25 and 27 and the sync input of TV camera 71.

FIG. 7 shows representative sync pulse relationships. FIGS. 4(A), (B), and (C) depict typical left, mid, and right projector sync pulses that have been appropriately delayed by the aforementioned delays 13, 15, and 17, respectively. Consequently, as portrayed, each pulse thereof relates to its adjacent projectors active time period in sequence without a gap therebetween caused by the blanking time period. Thus, the train of pulses shown in FIG.4(A) occurs during the −120° to −40° sector of display screen 103, and at the end of its sweep time, the train of pulses shown in FIG. 4(B) starts and covers the −40° to +40° sector of display screen 103, and at the end of its sweep time, the train of pulses shown in FIG. 4(C) starts and covers the +40° to +120° sector of display screen 103. Were it not for such arrangement, there would be a gap in presentation, a partial loss of the picture, either at the end of one raster or the beginning of the following raster when the video signal ovelaps two projector rasters.

The pulse trains of FIGS. 4(D), (E), (F), (G), and (H) represent fields of view of camera 71 when its optical probe 73 looks at different segments of the overall view.

Assume for instance, that the center or mid sector only is active; that is, that pilot 31 is looking forward in the direction of the forward path of the aircraft (represented by 0° azimuth). For such condition, the sync pulses of mid projector 89 shown in FIG. 4(B) would be in coincidence with the sync pulses of camera 71 shown at FIG. 4(D). Of course, in this instance, the movable arm of selector switch 35 would be located in the center or nocontact position, thereby making the inputs of AND gate 43 be at a "1" or logic high, so as to cause it to produce a "1" at the output thereof. Thus, the output of OR circuit 49 is also a "1," which, in turn, regulates mid video switch 67 to a closed switch condition, thereby enabling mid projector 89, so as to cause the video picture to be projected on mid sector 99 of screen 103.

At the same time, the aforesaid "1" signal is supplied to inverter 45, where it is inverted to a logic low or "0" before being supplied to one of the inputs of AND gate 51 to effect the inhibiting thereof. Obviously, under such circumstances, no control signal is supplied to left video switch 65, leaving it open, and, thus, no video picture signal is passed on to left projector 85. Similarly, the inverted "1" or "0" from inverter 47 inhibits AND gate 53, which then produces a "0" at the output thereof. Said "0" is inverted to a "1" by inverter 59; but since the output from inverter 47 is a "0," AND gate 61 is inhibited, and no signal is supplied to right video switch 69. Therefore, no video signal passes therethrough to right video projector 89, and, consequently, right sector 101 of screen 103 remains blank.

Considering now the situation where pilot 31 looks to the left. The camera pulse train of FIG. 7(E) represents that condition, with the pulses thereof being delayed by the movable arm on the resistance element of potentiometer 37 and operated on by delay 19 to produce the delayed camera sync signal at the output thereof which is supplied to the sync signal input of camera 71. Also, in that case, the movable arm of switch 35 has been moved to the −80° point and is now in electrical contact with the left (upper as shown in FIG. 1) contact thereof. So doing produces a "0" at the inputs of AND gate 43 and inverter 45, the latter of which inverts it to a "1" to effect the enabling of AND gate 51. For this purpose, let it be assumed that flipflops 25 and 27 change state only upon application of the positive going edge of a "1" pulse, then the camera sync pulse becomes a "1" (as represented by FIG. 7(E) and is inverted to a "0" by inverter 23. By the "0" Pulse from delay 13 at that time prevents flipflop 21 from changing state. However, when the "1" camera sync pulse ends and becomes "0," its inverted "1" pulse produces a positive going "1" pulse at the set input of flipflop 25, thereby causing it to change state, produce a "1" at the middle input of AND gate 51 to enable it and left video switch 65, so as to cause closure thereof. Of course, the closure of left video switch 65 permits the camera video output signal to pass to left projector 85 to be projected to left sector 97 of display screen 103 thereby. During this time, the left sync pulse is "0" at the input of inverter 23, inverted to a "1" thereby, thus supplying a "1" to the third input of AND gate 51, so as to enable it and enable left video switch 65. After being inverted by inverter 55 to produce a "0" at one of the inputs of AND gate 57 to inhibit it, a "0" is supplied to the upper input of OR circuit 49. The other two inputs of OR circuit 49 are also "0" by virtue of the "0" at the upper input of AND gate 43 and the "1" on the lower input thereof which, in turn, effects the inhibiting of AND gate 53.

Having turned on the video to the left projector halfway through the projector scan, the left side of the picture picked up by camera 71 is produced on the right portion of the left projector screen sector. When the left projector's sweep reaches its right edge, the left sync signal pulse of FIG. 7(A) goes to "1,". This signal appears at the reset input of flipflop 25, cutting off the enabling level to AND gate 51 and, in turn, the enabling to left video switch 65, turning off left projector 85. At the same time that the "0" is supplied to inverter 55, the upper input to AND gate 43 is "0," the output of inverter 45 is "1" which enables the other input of AND gate 57, thus turning on mid video switch 67 through OR circuit 49 and starting mid projector 87.

The next event occurs when camera 71 runs to the end of its sweep. This occurs at 0° azimuth for the field of view being described. As the camera sync pulse goes to "1," the video is inhibited at camera 71 through its normal blanking function, and the scan returns to the beginning of the raster line. Upon completion of this period, the inverted camera sync pulse again sets flipflop 25 to turn on the left video switch 65, so as to allow video to be supplied to left projector 85. This cycle then repeats itself over and over, and for any aim point beyond 0° and up to −80° to the left, the description of the function would be the same.

When the aim point moves to the right beyond 0°, the movable arm of switch 35 contacts the lower contact thereof, producing a logic "0" at AND gate 43 and inverter 47, where it gets inverted by the latter to a "1" to enable one input of AND gate 53 and AND gate 61. When the camera sync pulse goes to 1 — as shown in FIG. 7(G) — the camera video is turned off, then goes to "0." Because of its inversion by inverter 28, it becomes a "1" and sets flipflop 27, and thus produces a "1" at the center input to AND gate 53. The mid sync pulse train of FIG. 7(B) being "0" at that time allows inverter 29 to produce a "1" at the output thereof which is supplied to the third input of AND gate 53, thus enabling it and disabling AND gate 61, right video switch 69, and right projector 89, but turning on the mid video switch 67 via OR circuit 49.

When the sweep of mid projector 87 reaches its end at +40°, the mid sync pulse goes to "1" to reset flipflop 27, thus turning off mid video switch 67. The "0" at the output of AND gate 53 is inverted by inverter 59 to enable AND gate 61; and because the output of inverter 47 is already a "1," the right video switch 69 is enabled and right projector 89 receives video signals from camera 71. Upon arrival of the next camera sync pulse, this process repeats itself.

From the foregoing it may be seen that there are several combinations and permutations of the above mentioned switching operations and, thus, for any assumed point of the image field of view, the switching of switching logic circuit 21 can effectively turn the video signal from camera 71 off or on as required to present the correct scene in the correct screen sector for any azimuth disposition of the head of pilot 31 within a viewing angle of −120° to +120°, such as, for example, the middle and right screen sectors depicted in FIGS. 5 and 6, respectively, or in a similarly projected left screen sector not illustrated in the drawing for the sake of keeping this disclosure as simple as possible. Of course, as also would be obvious to the artisan, all of the aforegoing components of said switching logic circuit 21 — a key component of the invention — function in their well known conventional manners, respectively, and, thus, when the composite operation thereof combines with the aforesaid other components associated therewith, the subject invention readily performs to achieve the aforementioned objectives.

Obviously many modifications and variations of the present invention are possible in the light of the above teachings. It is therefore to be understood that within the scope of the appended claims the invention may be practiced otherwise than as specifically described.

What is claimed is:

1. An object trackable projection system, comprising in combination:
   a predetermined number of predetermined energy projection means;
   a like predetermined number of switch means effectively connected to said predetermined number of predetermined energy projection means for timely and selectively supplying a data signal thereto in response to a number of timing signals;

means connected to said predetermined number of switch means for selectively and timely supplying said number of timing signals thereto in substantial correspondence with a predetermined number of positions of the aforesaid object, respectively;

means for producing a predetermined picture image;

a television camera, having an optical input, a synchronization signal input, and a data signal output, spatially disposed from said predetermined picture image producing means in such manner that the optical input thereof effectively views the picture image produced thereby, with the synchronization signal input thereof connected to the aforesaid timing signal supplying means for response to one of the timing signals supplied thereby, and with the output thereof connected to each of said predetermined number of switch means for supplying said data signal thereto;

optical probe means disposed between said predetermined picture image producing means and the optical input of said television camera for effecting the optical scanning thereof thereby in accordance with a given drive signal; and means effectively connected between the aforesaid object and said optical probe means for supplying said given drive signal thereto, so as to effect the driving thereof in substantial correspondence with the aforesaid predetermined number of positions of said object.

2. The device of claim 1, wherein said predetermined energy projection means comprises a trio of light projectors which project visible images of video signals supplied thereto.

3. The device of claim 1, wherein said object is a human head that is rotatable on given axis.

4. The device of claim 1, wherein said predetermined number of switch means comprises a trio of electrical switches.

5. The device of claim 1, wherein said means connected to said predetermined number of switch means for selectively and timely supplying said number of timing signals thereto in substantial correspondence with a predetermined number of positions of the aforesaid object, respectively, comprises:

a sensor for continuously determining the position of said object and for producing predetermined analog signals proportional thereto; and means for generating a predetermined number of synchronization signals at the outputs thereof;

a switching logic circuit connected to predetermined outputs of said synchronization signals generating means and between the analog signals outputs of said sensor and the control inputs of said predetermined number of switch means for supplying the aforesaid timing signals thereto in response to said analog and synchronization signals.

6. The device of claim 5, wherein said means for generating a predetermined number of synchronization signals at the outputs thereof comprises:

means for generating a master frequency synchronization signal; and a plurality of predetermined delay means connected to the output of said master frequency sync signal generating means.

7. The device of claim 5, wherein said switching logic circuit connected to predetermined outputs of said synchronization signals generating means and between the analog signals outputs of said sensor and the control inputs of said predetermined numer of switch means for supplying the aforesaid timing signals thereto in response to said analog and synchronization signals comprises:

a first input terminal;

a first inverter having an input and an output, with the input thereof connected to said first input terminal;

a second input terminal;

a first flipflop having a set input, a reset input, and an output, with the set input thereof connected to said second input terminal, and with the reset input thereof connected to said first input terminal;

a third input terminal;

a second inverter having an input and an output, with the input thereof connected to said third input terminal;

a fourth input terminal;

a first AND gate having a pair of inputs and an output, with the inputs thereof respectively connected to said third and fourth input terminals;

a third inverter having an input and an output, with the input thereof connected to said fourth input terminal;

a fifth input terminal;

a second flipflop having a set input, a reset input, and an output, with the set input thereof connected to said second input terminal, and with the reset input thereof connected to said fifth input terminal;

a fourth inverter having an input and an output, with the input thereof connected to said fifth input terminal;

a second AND gate having a trio of inputs and an output, with the inputs thereof respectively connected to the output of said first inverter, the Q output of said first flipflop, and the output of said second inverter;

a third AND gate having a trio of inputs and an output, with the inputs thereof respectively connected to the output of said third inverter, the Q output of said second flipflop, and the output of said fourth inverter;

a fifth inverter having an input and an output, with the input thereof connected to the output of said second AND gate;

a sixth inverter having an input and an output, with the input thereof connected to the output of said third AND gate;

a fourth AND gate having a pair of inputs and an output, with the inputs thereof respectively connected to the outputs of said second and fifth inverters;

a fifth AND gate having a pair of inputs and an output, with the inputs thereof respectively connected to the outputs of said third and sixth inverters; and an OR circuit having a trio of inputs and an output, with the inputs thereof respectively connected to the outputs of the aforesaid first AND gate, the aforesaid third AND gate, and the aforesaid fourth AND gate.

8. The device of claim 1, wherein said means for producing a predetermined picture image comprises a model board with a predetermined scene constructed thereon.

9. A head trackable visual system, comprising in combination:

a plurality of means for projecting a like plurality of optical images toward a like plurality of visible sectors of a display screen, respectively, in response to a video signal and a plurality of synchronization signals;

means for generating the aforesaid video signal;

a plurality of switch means respectively connected to the output of said video signal generating means and the video inputs of said plurality of projecting means for timely supplying said video signal thereto, respectively, in response to a plurality of timing signals;

means connected to said plurality of switch means for respectively and selectively supplying said plurality of timing signals thereto in response to said plurality of synchronization signals and in correspondence with predetermined dispositions of the aforesaid head; and means connected to said plurality of projecting means and said plurality of timing signals supplying means for timely supplying the aforesaid plurality of synchronization signals thereto, respectively.

10. The device of claim 9, wherein said head is the head of a human being.

11. The device of claim 9, wherein said plurality of means for projecting a like plurality of optical images toward a like plurality of visible sectors of a display screen, respectively, in response to a video signal and a plurality of synchronization signals comprises a trio of light projectors.

12. The device of claim 9, wherein said display screen has a predetermined geometrical configuration and a concave surface that is light energy reflective.

13. The device of claim 9, wherein said display screen is a substantially spherical screen having a light reflective inside surface which is spatially disposed about said head in such manner that the eyes thereof are contiguously disposed with substantially the center of the aforesaid display screen.

14. The device of claim 9, wherein said means for generating the aforesaid video signal comprises a television camera.

15. The device of claim 9, wherein said means for generating the aforesaid video signal comprises:
a television camera; and
a model board spatially disposed from said television camera but in the field of view thereof.

16. The device of claim 9, wherein said means for generating the aforesaid video signal comprises:
a television camera;
a model board spatially disposed from said television camera but in the field of view thereof; and
a rotatable optical probe disposed between said model board and said television camera.

17. The device of claim 9, wherein said means connected to said plurality of switch means for respectively and selectively supplying said plurality of timing signals thereto in response to said plurality of synchronization signals and in correspondence with predetermined dispositions of the aforesaid head comprises:
a helmet adapted for being worn by said head;
means effectively connected to said helmet for producing a plurality of voltages at the outputs thereof that are substantially proportional to the position thereof with respect to a predetermined reference direction; and
a switching logic circuit connected to the outputs of said plurality of synchronization signals generating means and between the outputs of the aforesaid voltages producing means and the control inputs of said plurality of switch means.

18. The device of claim 17, wherein said switching logic circuit connected to the outputs of said plurality of synchronization signals generating means and between the outputs of the aforesaid voltages producing means and the control inputs of said plurality of switch means comprises:
a first input terminal;
a first inverter having an input and an output, with the input thereof connected to said first input terminal;
a second input terminal;
a first flipflop having a set input, a reset input, and an output, with the set input thereof connected to said second input terminal, and with the reset input thereof connected to said first input terminal;
a third input terminal;
a second inverter having an input and an output, with the input thereof connected to said third input terminal;
a fourth input terminal;
a first AND gate having a pair of inputs and an output, with the inputs thereof respectively connected to said third and fourth input terminals;
a third inverter having an input and an output, with the input thereof connected to said fourth input terminal;
a fifth input terminal;
a second flipflop having a set input, a reset input, and an output, with the set input thereof connected to said second input terminal, and with the reset input thereof connected to said fifth input terminal;
a fourth inverter having an input and an output, with the input thereof connected to said fifth input terminal;
a second AND gate having a trio of inputs and an output, with the inputs thereof respectively connected to the output of said first inverter, the Q output of said first flipflop, and the output of said second inverter;
a third AND gate having a trio of inputs and an output, with the inputs thereof respectively connected to the output of said third inverter, the Q output of said second flipflop, and the output of said fourth inverter;
a fifth inverter having an input and an output, with the input thereof connected to the output of said second AND gate;
a sixth inverter having an input and an output, with the input thereof connected to the output of said third AND gate;
a fourth AND gate having a pair of inputs and an output, with the inputs thereof respectively connected to the outputs of said second and fifth inverters;
a fifth AND gate having a pair of inputs and an output, with the inputs thereof respectively connected to the outputs of said third and sixth inverters; and
an OR circuit having a trio of inputs and an output, with the inputs thereof respectively connected to the outputs of the aforesaid first AND gate, the aforesaid third AND gate, and the aforesaid fourth AND gate.

19. The device of claim 17, wherein said means effectively connected to said helmet for producing a plurality of voltages at the outputs thereof that are substantially proportional to the position thereof with respect to a predetermined reference direction comprises:

a sector selector switch having first and second electrical slide contacts with a predetermined insulated gap therebetween and a rotatable arm slidably engagable with any of said contacts or said gap, depending on the disposition thereof at any given time;

a ground;

a positive direct current voltage;

a potentiometer having a resistance element and a rotatable arm in constant slidable engagement therewith, with one terminal of the resistance element thereof connected to said ground and the rotatable arm of said sector selector switch, and with the other terminal thereof connected to said positive direct current voltage; and flexible drive means effectively connected between the rotatable arms of said sector selector switch and potentiometer and the aforesaid helmet.

20. The invention of claim 9, further characterized by a mock cockpit spatially disposed from and around said head.

21. The device of claim 20, wherein said mock cockpit is a mock aircraft cockpit.

22. The device of claim 9, wherein said means connected to said plurality of projecting means and said plurality of timing signals supplying means for timely supplying the aforesaid plurality of synchronization signals thereto, respectively, comprises:

means for generating a master sync signal; and a plurality of delay means connected between the output of said master sync signal generating means and the control inputs of said plurality of projecting means, respectively.

23. The device of claim 22, wherein said plurality of delay means comprises a trio of delay lines, with the time delay of each thereof being different from that of the others.

24. A head trackable wide angle visual system, comprising in combination:

a master horizontal sync signals generator;

a first delay line connected to the output of said master horizontal sync signals generator;

a second delay line connected to the output of said master horizontal sync signals generator;

a third delay line connected to the output of said master horizontal sync signals generator;

a fourth delay line having a data input, a control input, and an output, with the data input thereof connected to the output of said master horizontal sync signals generator;

a first inverter connected to the output of said fourth delay line;

a selector switch having first and second electrical contacts with a space therebetween and a movable arm adapted for being moved in contact with said first and second electrical contacts and within said space therebetween;

a ground connected to the aforesaid movable arm of said selector switch;

a potentiometer having a resistance and a movable arm in slidable contact therewith, with one of the terminals of the resistance thereof connected to the aforesaid ground, and with the movable arm thereof connected to the control input of the aforesaid fourth delay line;

a positive direct current voltage connected to the other terminal of the resistance of said potentiometer;

a helmet adapted to be worn by the aforesaid head;

flexible mechanical means connected between said helmet and the movable arms of the aforesaid selector switch and potentiometer for the turning thereof therewith;

a second inverter having an input and an output, with the input thereof connected to the output of the aforesaid first delay line;

a first flipflop having a set input, a reset input, and a Q output, with the set input thereof connected to the output of the said first inverter, and with the reset input thereof connected to the output of the aforesaid first delay line;

a third inverter connected to one of the electrical contacts of the aforesaid selector switch;

a fourth inverter connected to the other of the electrical contacts of the aforesaid selector switch;

a first AND gate having a pair of inputs and an output, with the inputs thereof respectively connected to said electrical contacts of the aforesaid selector switch;

a fifth inverter having an input and an output, with the input thereof connected to the output of the aforesaid second delay line;

a second flipflop having a set input, a reset input, and an output, with the set input thereof connected to the output of said first inverter, and with the reset input thereof connected to the output of the aforesaid second delay line;

a second AND gate having a trio of inputs and an output, with the inputs thereof respectively connected to the output of said second inverter, the Q output of said first flipflop, and the output of said third inverter;

a third AND gate having a trio of inputs and an output, with the inputs thereof respectively connected to the output of said fourth inverter, the Q output of said second flipflop, and the output of said fifth inverter;

a sixth inverter connected to the output of said second AND gate;

a seventh inverter connected to the output of said third AND gate;

a fourth AND gate having a pair of inputs and an output, with the inputs thereof respectively connected to the outputs of said third and sixth inverters;

a fifth AND gate having a pair of inputs and an output, with the inputs thereof respectively connected to the outputs of said fourth and seventh inverters;

an OR circuit having a trio of inputs and an output, with the inputs thereof respectively connected to the outputs of said first, third, and fourth AND gates;

a television camera having a sync signal input, an optical signal input, and a video signal output, with the sync signal input thereof connected to the output of the aforesaid fourth delay line;

a rotatable optical probe effectively connected to the optical signal input of said television camera;

a drive motor effectively connected to said optical probe for timely effecting the rotation thereof about a predetermined axis thereof;

a servomechanism having an input and an output, with the input thereof effectively connected to the movable arms of said selector switch and potentiometer and the aforesaid helmet, and with the output thereof connected to the input of said drive motor;

a first video switch having a data input, a control input, and an output, with the data input thereof connected to the video signal output of said television camera, and with the control input thereof connected to the output of the aforesaid second AND gate;

a second video switch having a data input, a control input, and an output, with the data input thereof connected to the video signal output of said television camera, and with the control input thereof connected to the output of the aforesaid OR circuit;

a third video switch having a data input, a control input, and an output, with the data input thereof connected to the video signal output of said television camera, and with the control input thereof connected to the output of the aforesaid fifth AND gate;

a first projector having a data input, a control input, and an output, with the data input thereof connected to the output of said first video switch, and with the control input thereof connected to the output of the aforesaid first delay line;

a second projector having a data input, a control input, and an output, with the data input thereof connected to the output of said second video switch, and with the control input thereof connected to the output of the aforesaid second delay line;

a third projector having a data input, a control input, and an output, with the data input thereof connected to the output of said third video switch, and with the control input thereof connected to the output of the aforesaid third delay line;

means spatially disposed from the aforesaid optical probe in such manner that the light reflected therefrom will be received thereby in accordance with the relative positions therebetween; and a display screen having a predetermined geometrical configuration positioned in such manner as to have predetermined spatial dispositions with respect to the aforesaid helmet and the outputs of the aforesaid first, second and third projectors.

25. A switching logic circuit, comprising in combination:

a first input terminal;

a first inverter having an input and an output, with the input thereof connected to said first input terminal;

a second input terminal;

a first flipflop having a set input, a reset input, and an output, with the set input thereof connected to said second input terminal, and with the reset input thereof connected to said first input terminal;

a third input terminal;

a second inverter having an input and an output, with the input thereof connected to said third input terminal;

a fourth input terminal;

a first AND gate having a pair of inputs and an output, with the inputs thereof respectively connected to said third and fourth input terminals;

a third inverter having an input and an output, with the input thereof connected to said fourth input terminal;

a fifth input terminal;

a second flipflop having a set input, a reset input, and an output, with the set input thereof connected to said second input terminal, and with the reset input thereof connected to said fifth input terminal;

a fourth inverter having an input and an output, with the input thereof connected to said fifth input terminal;

a second AND gate having a trio of inputs and an output, with the inputs thereof respectively connected to the output of said first inverter, the output of said first flipflop, and the output of said second inverter;

a third AND gate having a trio of inputs and an output, with the inputs thereof respectively connected to the output of said third inverter, the output of said second flipflop, and the output of said fourth inverter;

a fifth inverter having an input and an output, with the input thereof connected to the output of said second AND gate;

a sixth inverter having an input and an output, with the input thereof connected to the output of said third AND gate;

a fourth AND gate having a pair of inputs and an output, with the inputs thereof respectively connected to the outputs of said second and fifth inverters;

a fifth AND gate having a pair of inputs and an output, with the inputs thereof respectively connected to the outputs of said third and sixth inverters;

an OR circuit having a trio of inputs, with the inputs thereof respectively connected to the outputs of the aforesaid first AND gate, the aforesaid third AND gate, and the aforesaid fourth AND gate; and video switch means for receiving the outputs from said fifth AND gate and OR circuit.

* * * * *